United States Patent [19]

Borges et al.

[11] Patent Number: 4,839,919

[45] Date of Patent: Jun. 13, 1989

[54] TELEPHONE AND DEMODULATOR

[76] Inventors: Marcos V. P. Borges, Rua Antonio Portugal 54; Marcelo V. Aragao, Avenida Antonio Paulino 286; Carlos T. Dias, Rua Com. Custodio Ribeiro 547A, all of Santa Rita do Sapucai, M.G., Brazil

[21] Appl. No.: 51,626

[22] PCT Filed: Aug. 15, 1986

[86] PCT No.: PCT/BR86/00015

§ 371 Date: Apr. 13, 1987

§ 102(e) Date: Apr. 13, 1987

[87] PCT Pub. No.: WO87/01256

PCT Pub. Date: Feb. 26, 1987

[30] Foreign Application Priority Data

Aug. 16, 1985 [BR] Brazil .......................... PI 8504012

[51] Int. Cl.4 .................. H04M 11/00; H04M 3/42; H04M 1/00
[52] U.S. Cl. ........................................ 379/96; 379/98; 379/216; 379/354; 379/355
[58] Field of Search ................... 379/93, 96, 97, 98, 379/216, 354, 355

[56] References Cited

U.S. PATENT DOCUMENTS

| | | | |
|---|---|---|---|
| 4,278,845 | 7/1981 | Chiou | 379/354 |
| 4,414,675 | 11/1983 | Comroe . | |
| 4,473,720 | 9/1984 | Hegi | 379/354 |
| 4,475,013 | 10/1984 | Lee et al. | 379/216 |
| 4,503,288 | 3/1985 | Kessler | 379/96 |
| 4,700,378 | 10/1987 | Brown | 379/96 |
| 4,709,387 | 11/1987 | Masuda | 379/354 |

FOREIGN PATENT DOCUMENTS

| | | | |
|---|---|---|---|
| 3044642 | 7/1982 | Fed. Rep. of Germany . | |
| 3231835 | 3/1984 | Fed. Rep. of Germany . | |
| 3301498 | 7/1984 | Fed. Rep. of Germany . | |
| 3425841 | 1/1986 | Fed. Rep. of Germany | 379/354 |
| 2225901 | 11/1974 | France . | |
| 2078465 | 1/1982 | United Kingdom | 379/93 |

OTHER PUBLICATIONS

Patents Abstracts of Japan, vol. 4, No. 165 (E-34) (647), Nov. 15, 1980 & JP, A. 55112061 (Katsumi), Aug. 29, 1980, see the whole document.

Electronics International, vol. 55, No. 25, Dec. 1982, New York (US), K. Karstad: "Microsystem Modem Makes Dialling-up a Breeze", pp. 150-153, see p. 153, left-hand column, last paragraph.

Patents Abstracts of Japan, vol. 6, No. 111 (E-114) (989), Jun. 22, 1982, & JP, A. 5741059 (Tamura), Mar. 6, 1982, see the whole document.

J. Millman & H. Taub: "Pulbse, Digital, and Switching Waveforms", published 1965 McGraw-Hill, New York (US), pp. 236-240, see section 7-7; FIGS. 7-9, 7-11.

*Primary Examiner*—Jin F. Ng
*Assistant Examiner*—David H. Kim
*Attorney, Agent, or Firm*—Nixon & Vanderhye

[57] ABSTRACT

A telephone comprising a handset and an apparatus for receiving the handset provided with an alpha-numerical key-board, an alpha-numeral display, a programmed data processing unit, a read only memory and a random access memory associated with each other and with the data processing unit, an automatic dialing circuit controlled by the data processing unit and a communications controller for modulating data produced by the unit for transmission by the telephone line and for demodulating signals received from the telephone. The unit is programmed so as to be able to command an operation by means of the telephone line in dependence upon data received therefrom or derived from the keyboard. The keyboard includes a directory inquiries data bank key associated with the data processing unit. Upon pressing the directory inquiries key, the data processing unit causes the automatic circuit and the communications controller to access a directory inquiries data bank by means of the telephone line to search for information in the form of a telephone number in response to an inquiry previously written on the display by means of the keyboard, to receive the information in the form of a telephone number from the directory inquiries data bank, to indicate receipt thereof on the display, and to effect automatic dialing of the telephone number by means of the dialing circuit.

9 Claims, 10 Drawing Sheets

| CIRCUIT | POSITION |
|---------|----------|
| ROM | 0000H |
| RAM | 1000H |
| KEY | 2000H |
| DISPLAY | 3000H |
| LATCH$_1$ | 4000H |
| LATCH$_2$ | 5000H |
| | |
| | |

$\overline{WR} = A_{15} = 0$

FIG. 6

| $A_{12}$ | $A_{13}$ | $A_{14}$ | ROM | RAM | KEY | DISPLAY | LATCH$_1$ | LATCH$_2$ | | |
|---|---|---|---|---|---|---|---|---|---|---|
| 0 | 0 | 0 | 0 | 1 | 1 | 1 | 1 | 1 | 1 | 1 |
| 0 | 0 | 0 | 1 | 0 | 1 | 1 | 1 | 1 | 1 | 1 |
| 0 | 1 | 0 | 1 | 1 | 0 | 1 | 1 | 1 | 1 | 1 |
| 0 | 1 | 1 | 1 | 1 | 1 | 0 | 1 | 1 | 1 | 1 |
| 1 | 0 | 0 | 1 | 1 | 1 | 1 | 0 | 1 | 1 | 1 |
| 1 | 0 | 1 | 1 | 1 | 1 | 1 | 1 | 0 | 1 | 1 |
| 1 | 1 | 0 | 1 | 1 | 1 | 1 | 1 | 1 | 0 | 1 |
| 1 | 1 | 1 | 1 | 1 | 1 | 1 | 1 | 1 | 1 | 0 |

TELEPHONE AND DEMODULATOR

The present invention refers to a telephone provided with a data processing capability that permits it to execute functions that go far beyond those of what is commonly understood by the term telephone.

The informatics and telephoning arts have undergone constant technical development during the last decade which have lead to the development of large scale computers and data banks that are now available to the public which may access them over telephone lines with the assistance of micro- or mini computers which, in general, require a certain knowledge of computers.

In spite of the enormous technological development that has taken place during recent years, it is a fact that the telephone as invented by Graham Bell has not really advanced beyond its basic function to effect normal telephone connections in spite of a limited number of electronically unsophisticated incrementations, such as built-in memories, re-dial functions and the like. Thus little direct use has been made of an apparently simple telephone set to take advantage of the universal communications that are possible using normal utility telephone lines except, of course, for connections between two points.

The object of the present invention therefore is to provide a telephone that is virtually as simple to use as a conventional set, that has the appearance of a conventional set and is within the price range of the general public but which, at the same time, has data processing capabilities that permits it to execute functions which would normally require a micro- or mini computer in addition to the set.

According to the present invention a telephone comprising a handset and an apparatus for receiving the handset, is characterized in that the apparatus is provided with an alpha-numerical keyboard; an alpha-numerical display; a programmed data processing unit; a read only memory and a random access memory associated with each other, with said keyboard and with said data processing unit; an automatic dialling circuit controlled by said data processing unit; and a communications controller for modulating data produced by said data processing unit for transmission by the telephone line and for demodulating signals received from said telephone line to produce data intelligible to said data processing unit, said unit being so programmed as to be able to command an operation by means of the telephone line in dependence upon data received therefrom or from the keyboard.

The telephone of the present invention which will henceforth be denominated a computerized telephone is therefore capable of executing true computer functions in addition to its basic function of making telephone connections. One principal option is its use for making a direct "directory enquiry" followed by an automatic or semi-automatic connection to a subscriber whose number is identified as a result of the enquiry.

In order to provide a clearer picture of such a function, a simple example will now be given. The user wishes to place a call to a certain FERNANDO RAMOS whose address is Avenida Atlantica 123, Rio de Janeiro. He then "types" on the keyboard the name and address of that person, such data appearing on the alpha-numerical display which may be similar to those used on pocket-sized computers. Having checked that the data is correctly entered to his satisfaction, he lifts the handset and presses a key which operates a program to call directory enquiries. As soon as the connection is completed the relevant data bank at the exchange will be accessed and, assuming the data provided is correct and sufficient, the computerized telephone will receive an appropriate signal that will be demodulated and processed by the data processing unit and an appropriate message will be shown on the display, either in the form of the desired telephone number or in the form of an indication that the correct number has been found. The computerized telephone will then either automatically dial that number or will dial it upon the user pressing an appropriate key on the keyboard so as to complete the connection.

If, on the other hand, the data on the subscriber is insufficient, for example, there are two subscribers of the same name at the given address, the display will request further information so that the user may insert the middle name of the subscriber or the number of the apartment at that address as would be normal in any positive identification search in a data bank.

Another use could be the accessing of a data bank programmed to receive what is commonly known as the "Yellow Pages". Here, for example, the user might wish to know the identity of any tailor in a given neighbourhood. He would then type in the word "tailor" and the name of the neighbourhood and the display, after the data bank has been accessed, would provide him, one by one, with the names and telephone numbers of the tailors in that locality. An automatic or semi-automatic connection to the chosen tailor could then be made precisely as indicated above.

Clearly an infinity of other uses may be envisaged such as the accessing of other data banks, direct communications between two similar computerized telephones, transmission of telex or cable messages through public telex or cable services and so on, always bearing in mind that the telephone of the present invention presents no mystery to the ordinary person due to its general appearance i.e. of a telephone, and to the fact that the layout of the keyboard is preferably the same as a normal typewriter.

In order for the invention to be more perfectly understood, one embodiment thereof will now be described in sufficient detail for a person reasonably versed in the art not only to appreciate the concepts involved, but also to understand the specific circuitry necessary to put the invention into practice. Such an embodiment will be described merely by way of example and with specific reference to the accompanying drawings in which:

FIG. 10 (*a*) to (*d*) are diagrams illustrating the operation of the keyboard and controller shown in FIG. 9;

FIGS. 16 (a) and (b) show respectively the wave form produced by the modulator and the corresponding wave form actually transmitted;

FIG. 21 (a) shows a reset circuit;

FIG. 21 (b) shows three further control circuits;

Figure 1:
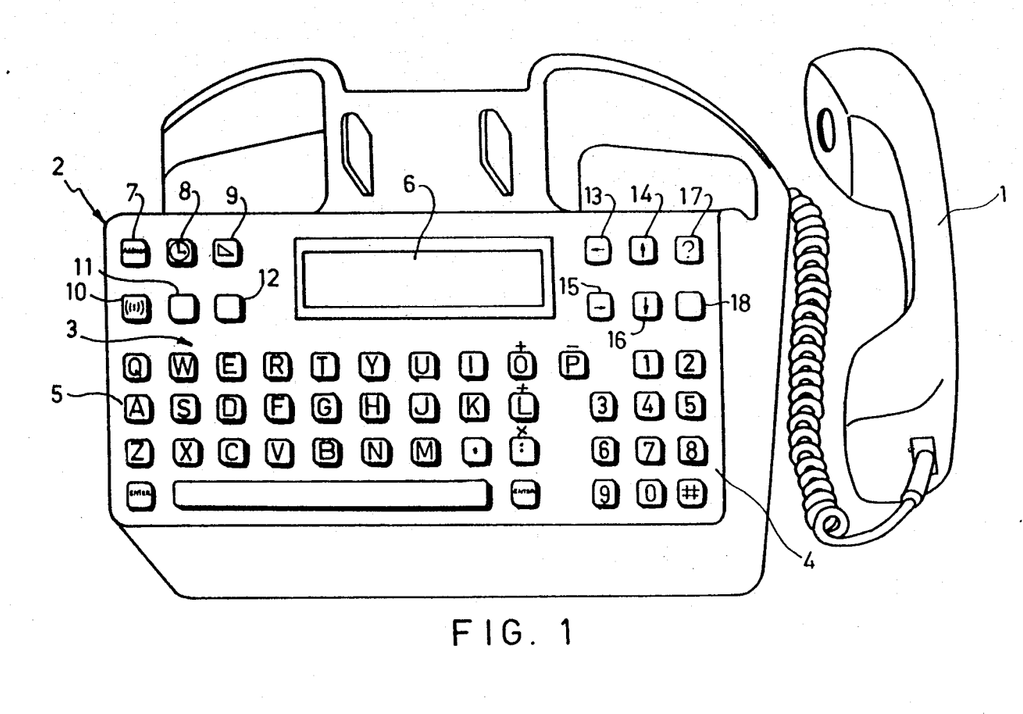
FIG. 1 is a perspective upper view of a computerized telephone manufactured in accordance with the present invention.

Referring now to the drawings, FIG. 1 shows an extremely important characteristic of the computerized telephone of the present invention, that is to say, the appearance of a normal telephone to which have been added keys following the general layout of a typewriter, as well as a liquid crystal display. This is important because its appearance is much more telephone than computer which alternates the psychological resistance to use which is found with even the simpler computers. Thus the instrument comprises a conventional handset 1 and an apparatus 2 whose casing may be that of any standard telephone.

The keyboard 3 comprises numerical keys 4 similar to a normal telephone and which may be used for conventional dialling, as well as alphabetical keys 5 which, as stated above, follow a standard typewritter layout. All of keys 4 and 5 may be used to write on the liquid crystal display 6. In addition, there is a number of function keys which, depending on the firmware employed, may be an Agenda key 7 for accessing an internal user programmed memory which may include names and telephone numbers, a clock key 8 for displaying conversation time on display 6, a bell volume control (press once) and display vision angle control (press twice) key 9, a directory enquiries key 10 for completing a connection to the relevant data bank at the exchange, an emergency key 11 for automatic dialling of emergency services (Police, etc.), a clear (press once) and calculator (press twice) key 12, display shift keys 13–16, an interrogation key 17 for requesting and indicating the type of information to be entered by the user, for example, prior to using key 10, and a delete key 18 to permit corrections of the display.

Figure 2:
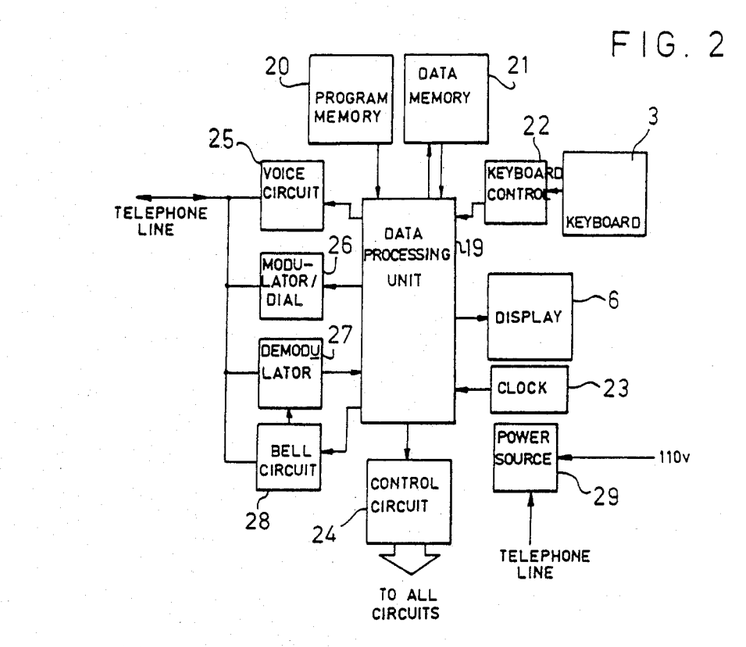
FIG. 2 is a simplified block diagram of the basic internal components of the telephone.

Turning now to FIG. 2, the internal components of the telephone of the present invention depend on a data processing unit 19 associated with a program memory 20, a data memory 21, the keyboard 3, a keyboard controller 22, the display 6, a system clock 23, a control circuit 24 which is connected to all the other circuits, a voice circuit 25, a modulator/dial circuit 26, a demodulator circuit 27, a telephone bell circuit 28 and the system power source 29.

The data processing unit 19 is a commercially available z 80- A component whose basic function is to command all the circuit operations of the telephone. This particular integrated circuit is chosen since it is sufficiently basic, not too unduly expensive but is efficient enough to execute all required functions. It uses the remaining components of the circuit to a maximum, carrying out many of its functions by means of software solutions so as to reduce hardware costs to a minimum.

The power source 29 transforms the alternating power supply of 110 or 220 volts to the 5 volts DC necessary for the operation of all the other circuits. It is shown more specifically in FIG. 3 which shows a standard transformer 30 such as is used for pocker calculators and the like (i.e. a unit which is plugged into the mains), producing an 8 volt AC output. This output is applied across a divider bridge 31 whose DC output is filtered by capacitor Cl and stabilized by an integrated circuit 32 whose output of +5 volts DC is then applied as a power source to the various circuits of the telephone and connected to an alternative nickel-cadmium battery 5V power supply. A second capacitor C2 is also used to eliminate high frequency noise.

Figure 3:
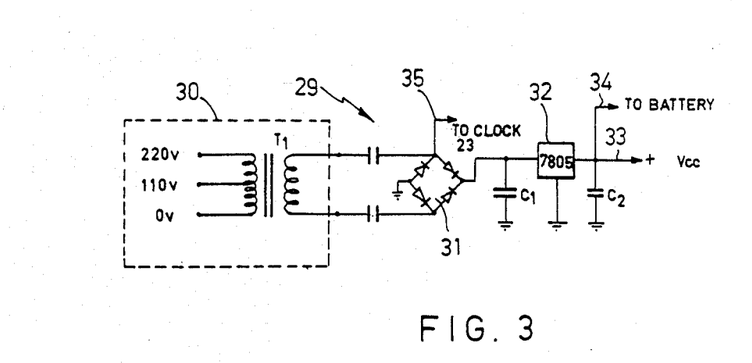
FIG. 3 is a circuit diagram of the power source.

It will also be observed that an output is taken from divider bridge 31 over line 35 to the system clock 23 which will now be described with reference to FIG. 4.

Figure 4:
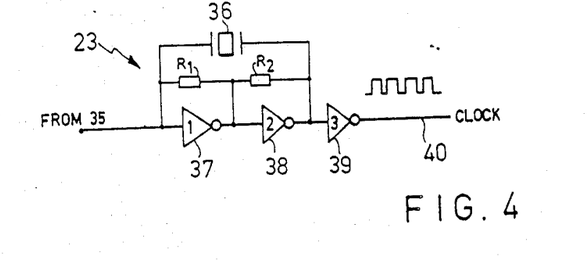
FIG. 4 is a circuit diagram of the clock circuit.

The clock circuit of FIG. 4 comprises a quartz crystal 36 connected in parallel with two series connected gates 37 and 38 and a voltage divider comprising resistors R1 and R2 having a centre tap connected between gates 37 and 38. A third series connected gate 39 provides the clock output on line 40 which is connected to both data processing unit 19 and display 6. The three gates 37, 38 and 39 are inverter gates and in practice, may comprise half of an integrated circuit type 74LS04.

Figure 5:
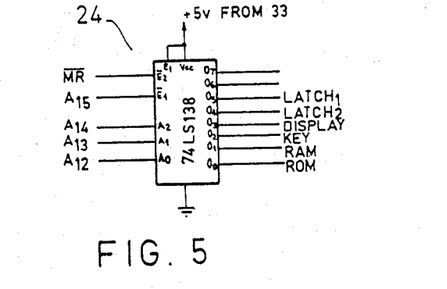
FIG. 5 is a circuit diagram of the control or decoder/demultiplexer circuit.
Figure 6:
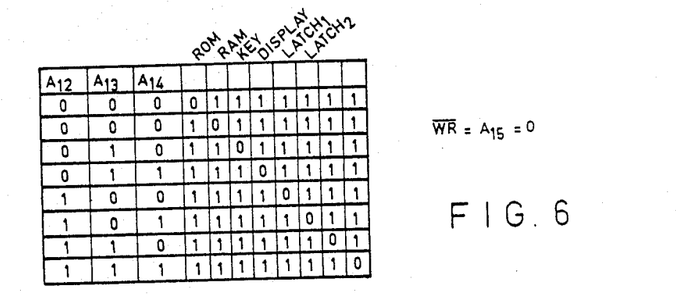
FIG. 6,7 and 8 are displays illustrating the function of the decoder of FIG. 5.
Figure 7:
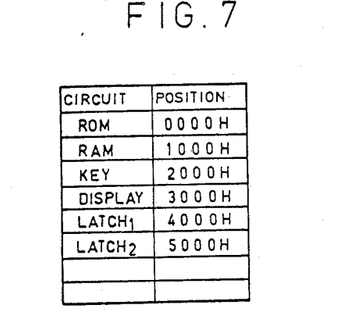
Figure 8:
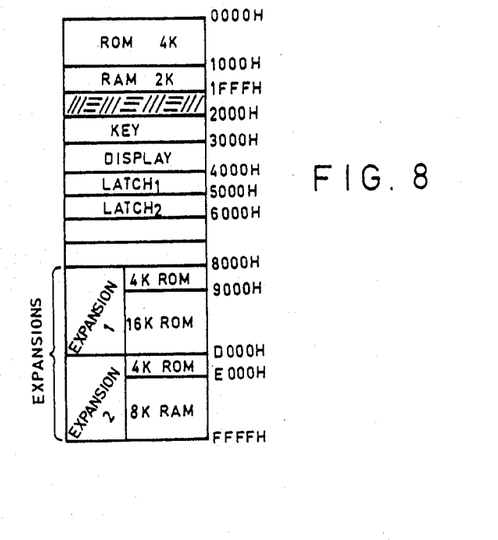

The control circuit 24 of FIG. 2 is shown in more detail in FIG. 5 and its fuctions are illustrated in FIGS. 6, 7 and 8. This circuit is an IC 74LS138 and comprises a 3 to 8 volt decoder/demultiplexer which functions to co-ordinate the tasks to be carried out as determined by data processing unit 19. It serves to inform any given circuit what is being required by unit 19. In other words, it is an address decoder which indicates the address to which a function imposed by the processing unit 19 should go.

Decoder 24 devides the memory area as shown in FIG. 6 and since it uses the address bus as A12, A13 and A14, the memory map is as shown in FIG. 7 or, in a physical illustration, as can be seen in FIG. 8.

The various circuits addressed by the data processing unit 19 are handled by decoder 24 as memory positions so as to simplify the hardware. This means a loss of 28K memory positions (approximately 44%) but since the equipment does not require a large memory volume, the remaining 36K are more than sufficient.

The standard model of the computerized telephone being described has a basic configuration with a ROM having a capacity of 4K and a RAM having a capacity of 2K but two optional expansions as small additional units may be plugged into apparatus 2, the first containing an extra capacity of 4K of ROM and 16K of RAM and the second containig 4K of ROM and 8K of RAM. of RAM.

Such a final configuration will have an empty area between 1800H and 1FFFH apart from the previously mentioned command circuit areas. With the optional expansions incorporated there will be;
12K of ROM
24K of RAM The control circuit or decoder 24 will not affect the optional expansions since the latter will have their own decoder and will be accessed as peripheral and not as memory positions ($\overline{MR} = 1$).

It should also be observed that the table of FIG. 6 shows complementary outputs (logic negative), that is to say, that circuit for which there is a zero output from the decoder is enabled. This is normal in micro processed circuits. There is no problem of advising the command circuits if a read or write operation is involved since all the circuits are unidirectional (either read only or write only). In point of fact, the programs refer to such circuits as non-variable memory positions whereby their characteristics are unchanging, That is to say, the program will always treat the keyboard 4 as a circuit which sends data to the processing unit 19 and never the contrary. Exceptions are the RAM memory 21 and the display 6 in which cases the read ($\overline{RD}$) and write ($\overline{WR}$) pins of unit 19 make the selection and differentiation of the read operations ($\overline{RD}=0$, $\overline{WR}=1$) and write operations ($\overline{RD}=1$, $\overline{WR}=0$). These operations will become clear later on when the general operation of the circuitry will be described.

The keyboard 3 and the keyboard controller 22 of FIG. 2 will now be described with reference to FIGS. 9 and 10(a)–10(d). As a most economical option, the keyboard control is operated by scanning the columns $A_o$ to $A_n$ using the address bus of processing unit 19, treating the scan of the keyboard as specific address positions. The rows are read through the data bus by a three-state buffer in the form of an integrated circuit 22 (74 LS 367).

Figure 9:
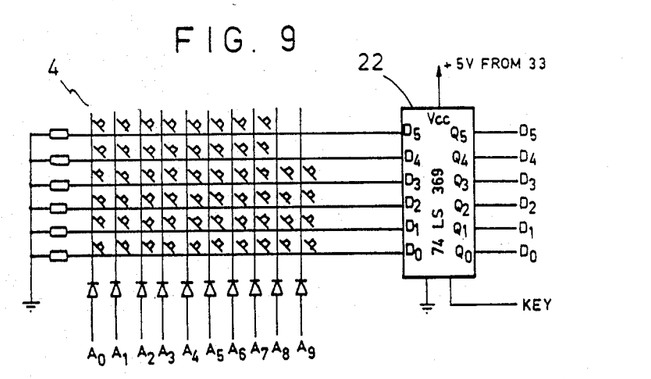
FIG. 9 is a circuit diagram of the keyboard and keyboard controller.

Once more the program is of prime importance and a given column is enabled with a high voltage level (logic 1) through the address bus. The columns which are not of interest receive a low (logic 0). If the key in the given column is not pressed, all the inputs to IC 22 are low. Even if a key in another non-enabled column is pressed, the outputs to IC 22 are low since the column of that key is also at logic zero.

There will only be a logic 1 at the input to IC 22 at which a key is pressed in an enabled column and at that instant the number of the row will appear via the corresponding input to buffer 22.

This may be better understood from FIGS. 10(a) to 10(d). In FIG. 10(a), column O is enabled and no key is pressed, giving an output of $00_B$. In FIG. 10(b) with column O still enabled, a key is pressed in that column so there is an output in row O (lower row). Finally, FIG. 10(d) shows a similar situation except that a key is pressed in row 1 of column O, giving an output in row 1 (upper row).

The keyboard scanning program obviously uses the principles illustrated in FIGS. 10(a) to 10(d), access to the keyboard 6 being effected as if memory positions were being accessed. Address calculation obeys the following formula:

$$E = 2000H + 2^c$$

where E is the column address and c is the desired column.

For example when column 3 is to be checked, the address is:

$$E = 2000H + 2^3$$

$$E = 2008H$$

The constant 2000 H is the address of the keyboard (see FIG. 7). Consequently, checking the memory position 2008 H and obtaining a number 16 as a result, means that there is a key pressed in column 3 and row 5.

Figure 11:
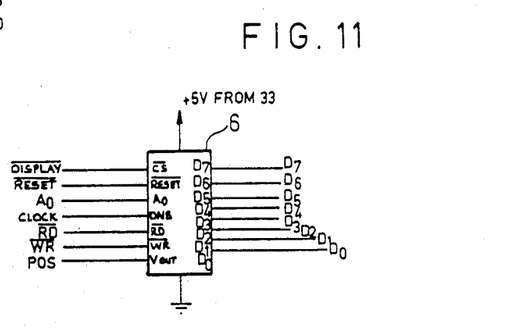
FIG. 11 shoes the display circuit.

The display 6 is an Edson Model EA.X16027NR whose connections are illustrated in FIG. 11 where the symbols are as follows:
$\overline{DISPLAY}$—corresponding output of decoder 24 (FIG. 5)
$\overline{RESET}$—from the reset circuit that will be described later
AO—address bus AO of the processing unit 19
CLOCK—from the clock circuit (FIG. 4)
$\overline{RD}$ and $\overline{WR}$—from the processing unit 19
POS—from the display observation position control circuit to be described later
$DO-D_7$—data bus from unit 19

Figure 12:
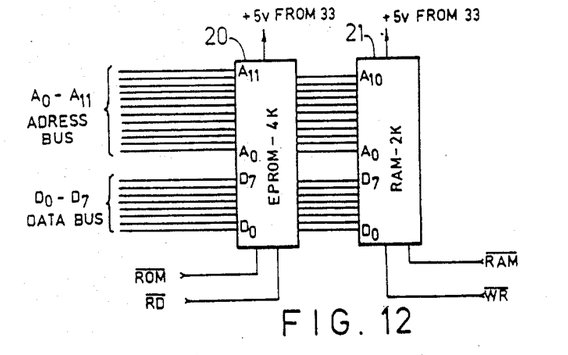
FIG. 12 is the circuit diagram of the program and data memories illustrated in block form in FIG. 2.

In order for the display to function correctly, processing unit 19 must carry out certain operations on the display component, such as:
supply of data
cursor position control
field of vision control
data reading and so on The program and data memories 20 and 21 respectively comprising a ROM and a RAM are shown in FIG. 12 in which:
$\overline{ROM}$ and $\overline{RAM}$—connected to decoder 24 (FIG. 5)
$\overline{RD}$ and $\overline{WR}$—connected to unit 19
Address and data buses—connected to unit 19

The program memory ROM 20 stores the programs necessary for the operation of the system, including the command and selection operations for the most varied tasks to be carried out by the other circuits. It is a non-volatile memory so that even when the telephone is disconnected and the power service 29 or battery is not functioning, the programs remain intact. Apart from the programs, ROM 20 contains certain information that cannot be lost due to a power supply failure. The ROM is a 2732 chip (EPROM)-4K).

As already mentioned an optional extension of ROM 20 may be plugged into the apparatus to provide an additional from 4096 addresses to 12288 which contain other application programs and, principally support for a number of options.

The data memory RAM 21 serves basically to store data injected by the user or by the processing unit 19 as a result of certain operations such as the last number dialed, communication buffer and the like. The initial capacity of this memory is 2048 address positions which in an optional extension may be increased to 26624.

As opposed to ROM 20, the data memory may store and read or alter data and its capacity related more directly to the information storage capacity of the telephone than merely to its versatility. RAM 21 can also store programs of a transitory nature used for special operations in specific applications, such as data communication. It is a volatile memory and data loss due to power failure is avoided due to an additional circuit in the power supply which uses both the mains current and that of the telephone line itself. Failure of both can be compensated by the battery connected to terminal 34 of power supply 29. RAM 21 is a 6116 component (chip).

Nothing truly novel is to be found in the circuit, the memories being part of the basic micro processor together with unit 19. It should be noted that RAM 21 has eleven address buses as opposed to twelve for ROM 20 (4K capacity as opposed to 2K). The manner in which unit 19 accesses the memories will be described later.

Figure 13:
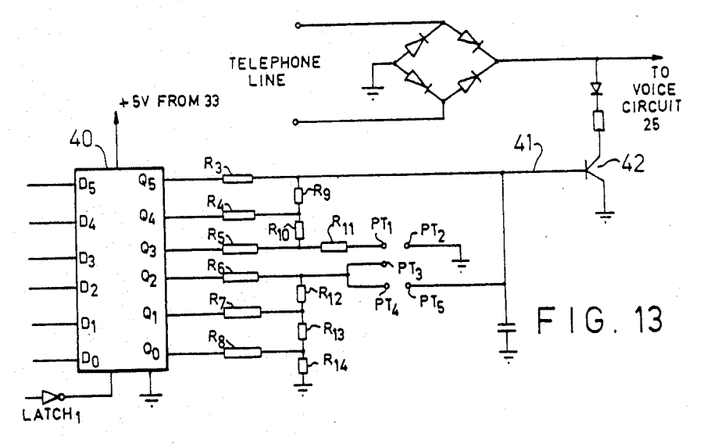
FIG. 13 is a circuit diagram of the modulator/dial circuit of FIG. 2.

The modulator/dial circuit 26 is illustrated in FIG. 13 and is based on a digital-analog convertor 40 connected to resistors $R_3$-$R_{14}$. Unit 40 is a 74 LS 174 chip. It is capable of carrying out its modulating and dialling functions in accordance with commands received from unit 19. The normal dialling function is commanded by unit 19 but, in the case of a power failure, hardware dialling direct from the keyboard is possible. The modulator function is to transmit data to the telephone line.

Figure 14:
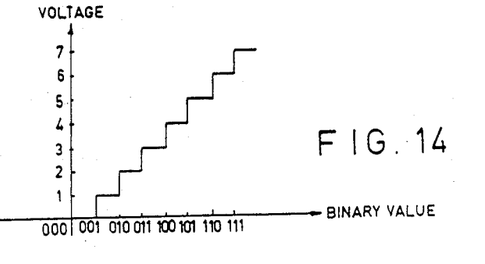
FIG. 14 is a table illustrating a 3-bit conversion of the modulator of FIG. 13.

The D/A convertor 40 serves to retain data provided by the processing unit 19 via the data bus during an undetermined time. The resistor network $R_3$-$R_{14}$ coupled to integrated circuit 40 converts the binary numbers received from unit 19 to voltages representative thereof. FIG. 14 exemplifies a conversion using three bits, for example, with terminal PT1 connected to PT3 and terminal PT4 disconnected from PT5 (see FIG. 13).

Figure 15:
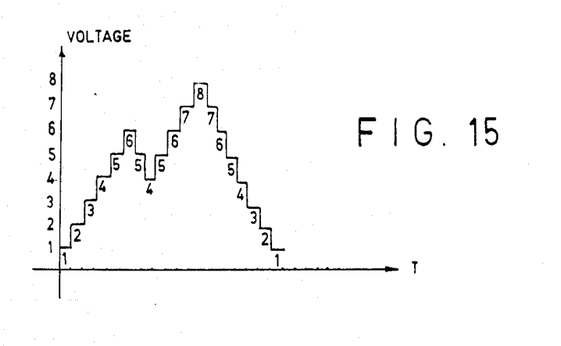
FIG. 15 shows the output wave corresponding to a conversion according to FIG. 14, of a given series of numbers.

In FIG. 14, each binary value applied to D/A convertor 40 corresponds proportionally to an output voltage. FIG. 15 shows the output wave form derived from the series of numbers 1,2,3,4,5,6,5,4,5,6,7,8,7,6,5,4,3,2,1.

The convertor 40 is thus capable of synthesizing very approximately any type of wave form, its precision being 6 bits which is equivalent to 64 different voltage levels (0–63).

For the dialling function, the circuit synthesizes a square wave using the maximum (63) and minimum (0) voltage levels, the dwell times being controlled according to telephone standards. This is known as decade or pulse dialling in which case terminal PT1 is connected to PT4 and terminal PT4 is not connected to PT5 (FIG. 13), forming a 6-bit conversion.

Multifrequency or tone dialling is possible with PT1 connected to PT2 and PT4 connected to PT5. In this configuration, it will be seen that the convertor is divided into two 3-bit convertors as is necessary to generate the two frequencies used in tone dialling.

The telephone may therefore be used with tone or pulse dialling by changing the jumps on the printed circuit board and, obviously advising the apparatus to carry out the corresponding dialling progress.

Data communication may be carried out by the modulator generating one of two types of modulation:
FSK—Frequency shift modulation
FSK or DPSK—Phase shift modulation The most used process is FSK in which made the modulator generates one frequincy for a 0 bit and another for a 1 bit.

The telephone is capable of digital or anolog transmission, the transmission rate being easily altered by means of software.

All signals leaving convertor 40 on line 41 are applied to the base of modulator transistor 42 to produce a modulation in the voice circuit 25 (FIG. 2).

Figure 16A:
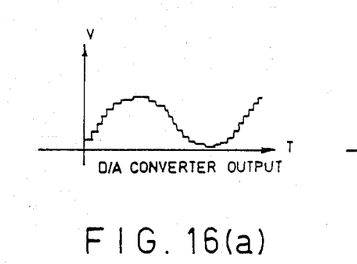
Figure 16B:
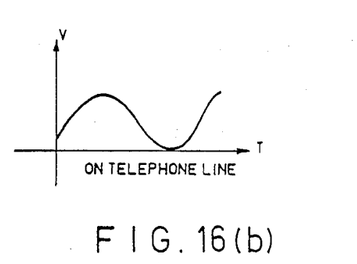

Waveform synthesization using a D/A convertor produces surprising results when the transmission medium is a telephone network since the latter acts as a low pass filter which further approximates the wave forms to those desired. FIGS. 16(a) and 16(b) provide a comparison between the output of the convertor and the signal on the telephone line.

Figure 17:
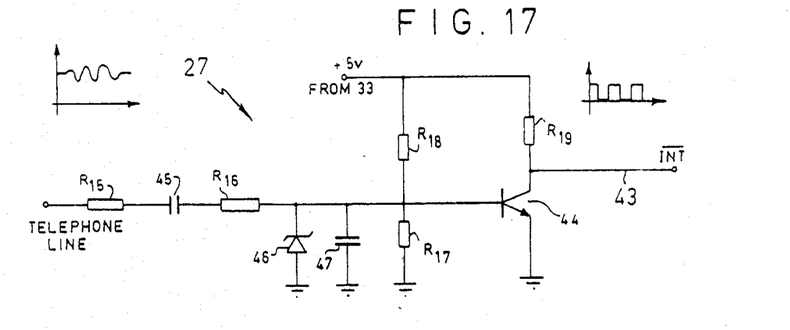
FIG. 17 is a circuit diagram of the demodulator.

Demodulator 27 of FIG. 2 which is shown in detail in FIG. 17 has to carry out a task which is much more complex than that of modulator 26 and comprises demodulating a signal on the telephone line. To explain the problems involved FSK type modulation will first be considered. In this mode two distinct frequencies are used ($F_1$ and $F_2$) representing binary 0 and 1, respectively. If BYTE "10011101" is to be transmitted over the telephone line, then one has to modulate thereon a sequence: $F_2$-$F_1$-$F_1$-$F_2$-$F_2$-$F_2$-$F_1$-$F_2$.

The receiver circuit must be capable of recognizing and separating $F_1$ and $F_2$, giving them values of 0 and 1, respectively (i.e. the inverse of modulation). Conventionally, the demodulation includes from active or passive filters to circuits using a phase locked loop. These procedures are costly and are not compatible with the compact inexpensive telephone concept of the present invention. The demodulator 27 shown in FIG. 17, however, was specially developed for the present computerized telephone and represents one of the most important factors for its conception as equipment for popular use.

Considering now the demodulator of FIG. 17 and bearing in mind that a frequency is inversely proportional to its period, what is done is to produce from the FSK modulated signal on the telephone line, a signal compatible with the central processing unit 19 of FIG. 2. The circuit of FIG. 17, it will be seen, is of extreme simplicity and the demodulation process is based purely on software applications.

When a signal from the telephone line is applied to the demodulator 27 which in reality is a simple signal shaper, an output is obtained on line 43 in the form of a square wave of the same frequency and phase as the fundamental frequency of the line signal. Square waves, however, are compatible with unit 19. Line 43 is thus connected directly to the $\overline{INT}$ pine of unit 19 which is capable of determining the frequency or phase by measuring the period between two low level pulses, for example. Unit 19 is suitably programmed based on interruption processes which are capable of measuring all types of frequency or phase used in the telephone.

This type of measurement permits the telephone to have various other applications since it is able to recognize any signal present on the line, for example: "ENGAGED", "RINGING", "DIAL TIME", its own bell ringing etc. If conventional processes were to be used with filters and other adjacent components, one would require a circuit designed to recognize each of the individual signals, apart from an interface having as many inputs as distinct signals to be recognized.

More specifically, the demodulator 27 of FIG. 17 comprises a transistor 44 whose base is connected to the telephone line through a simple series circuit comprising resistor R15, capacitor 45 and resistor R16, protected and filtered by Zener 46 and capacitor 47 and voltage biased and energized by power source 29 using resistors R17, R18 and R19.

Figure 18:
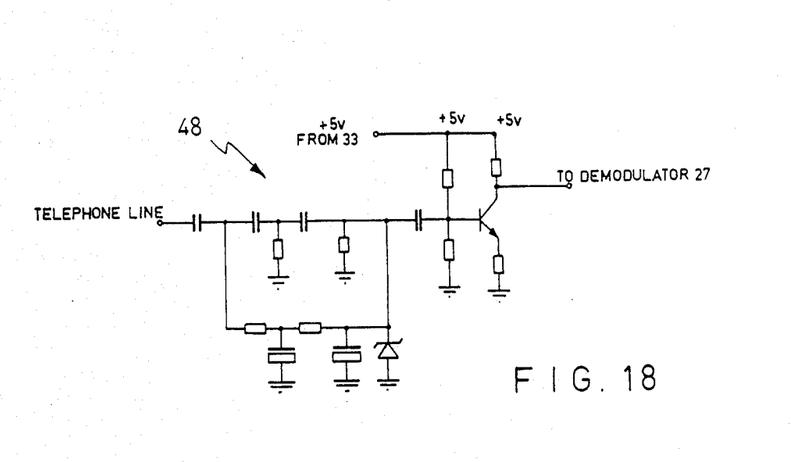
FIG. 18 shows a filter circuit associated with the demodulator of FIG. 17.

In order to avoid undue complexities in the program made necessary by the existence of noise in the telephone line, although it diminishes the velocity of communication, a filter circuit 48 is inserted between the line and demodulator 27, as shown in FIG. 18. Filter circuit 48 functions both to filter certain bands of noise and to amplify the input signal from the telephone line.

Although the transmission velocity of the telephone being described is considered low (usually 300 BITS per second) compared to those of conventional Modems, it is more than sufficient for this particular application and, as already mentioned, an elegant, simple and inexpensive solution is obtained using the circuits of FIGS. 17 and 18.

Figure 19:
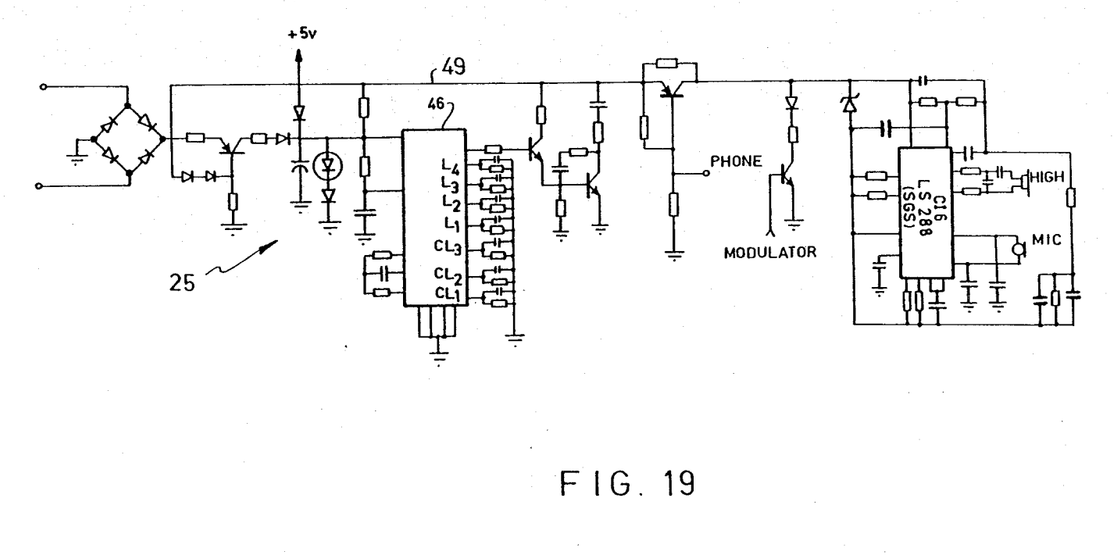
FIG. 19 shows the voice circuit of FIG. 2.

FIG. 19 shows the voice circuit 25 of FIG. 2 but will not be described in detail, it being observed that it has all the characteristics of any conventional telephone, using integrated circuiting for this purpose. Integrated circuit 49 is responsible for dialling when there is loss of power in power source 29, C1$_1$, C1$_2$, and C1$_3$ being connected to columns 1, 2 and 3 of the keyboard and L$_1$, L$_2$, L$_3$ and L$_4$ being connected to the respective rows thereof. The legend "Phone" is the output for the latch of FIG. 21(B) and the legend "Modulator" corresponds to an indication in FIG. 13.

Figure 20:
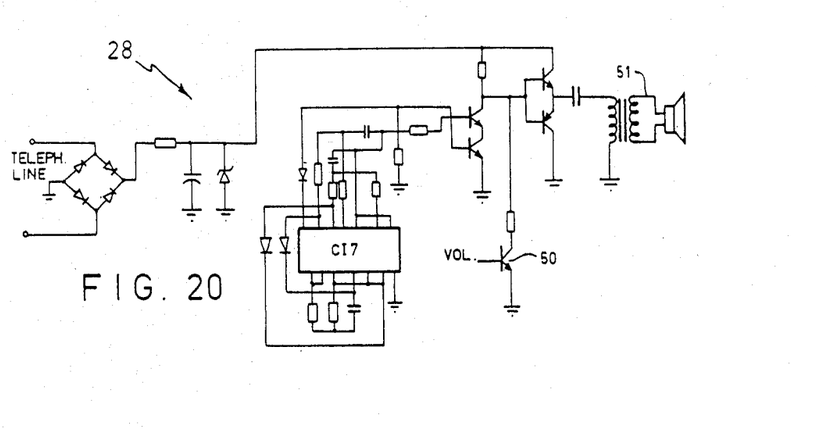
FIG 20 shows the bell circuit of FIG. 2.

The bell circuit 28 of FIG. 2 is shown in FIG. 20 but again will not be described since it is basically conventional in its function except for volume control indicated by the legend "VOL" against the base of control transistor 50. As will be appreciated, a variation of the bias voltage on such base will vary the volume of bell 51. This makes it possible to control the volume by means of the keyboard, thus eliminating the conventionally used potentiometers which are subject to mechanical wear. In addition, a bell ringing situation is recognized by the data processing unit 19 which makes it possible to use certain automatic operations such as automatic answering.

Figure 21:
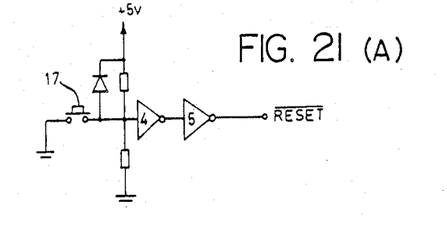

Four additional circuits are shown in FIGS. 21(A) and 21(B). FIG. 21(A) is the reset circuit which serves to effect automatic reset when the telephone is connected on manual reset by pressing key 17 (see also FIG. 1).

FIG. 21(B) shows the other three circuits, as follows:
Display vision angle control with 2 BITS for providing four different viewing angles (a$^2$), see output POS;
Bell volume control (see above with reference to FIG. 20) with 3 BITS giving eight volume settings (2$^3$), see output VOL; and
Phone ON/OFF which may be used for certain operations such as data communication and dialling, avoiding excessive noise, see output PHONE and also FIG. 19.

Figure 22:
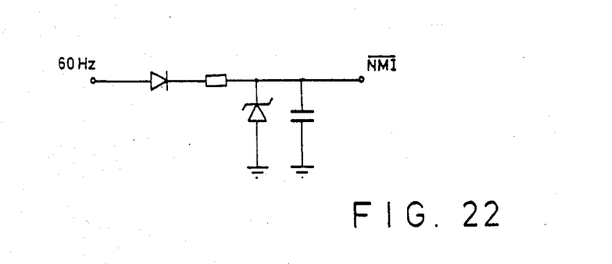
FIG. 22 shows a clock time base generating circuit.

Yet another circuit is that shown on FIG. 22 which generates the time base for the clock 23 of FIG. 4 whose input from line 33 has a frequency of 60 HZ and whose output pin is indicated as $\overline{\text{NMI}}$. Clock circuit 23 is a simplified signal shaper that provides processing unit 19 with a time base of one sixtieth of a second. Consequently sixty pulses per second have to be applied at pin $\overline{\text{NMI}}$ (non.maskable interruption). A specific program will make this count apart from the other normal clock functions such as alarm, conversation timer and so on.

Figure 23:
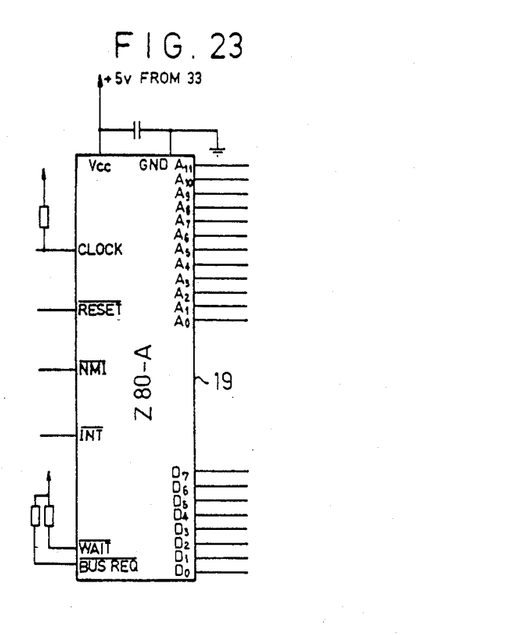
FIG. 23 shows the data processing unit of the computerized telephone of the invention.
Figure 24:
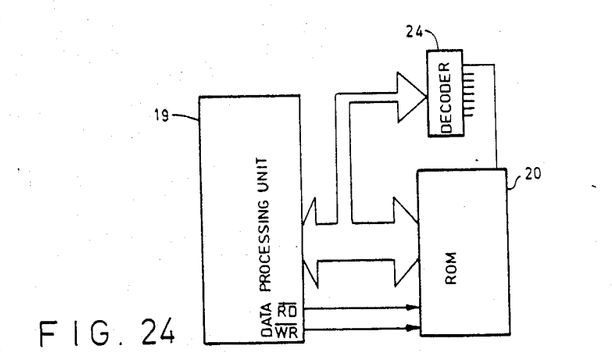
FIG. 24 illustrates read and write operations.

Finally, with respect to the specific circuit components, FIG. 23 shows the data processing unit 19 which has been chosen as a Z 80-A chip. FIG. 23 shows the relevant pin connections and does not require more detailed description since the pins are provided with legends that tie in with the other figures, the address bus and data bus connections being indicated as A$_0$–A$_{11}$ and D$_0$–D$_7$, respectively.

DESCRIPTION OF OPERATION

MEMORY WRITE AND READ

The write and read operations involve three circuits:
the data processing unit 19;
the ROM and RAM memories 20 and 21; and
the control circuit or decoder 24.

When the processing unit 19 carried out a write operation for memory position 100H, the circuit is as shown in FIG. 23. In this case, the address 100H enables output O$_0$ (see FIG. 5) since A12,A12,A14 and A15 are at logic zero, thus making ROM 20 available to unit 19. The information that a write operation is to be executed is given by a logic zero on the $\overline{\text{RD}}$ pin of unit 19.

READING OF KEYBOARD

Figure 10:
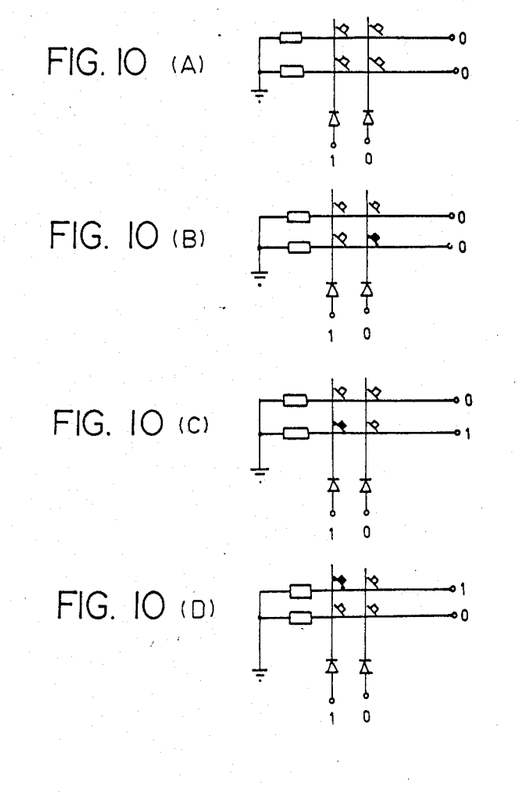

The keyboard is read in a manner identical to a memory position, as has already been explained in the description of the keyboard with respect to FIGS. 9 and 10. The keyboard scan program has to decode the values read (column and row numbers).

It is emphasised that the column position is created by the program itself and thus is known whereas the row in which a key is pressed has to undergo decoding. The program enables the columns sequentially until a pressed key is found

Operation with the Display

As with all the circuits controlled by unit 19, display 6 is also seen as a memory position. The display contains a small memory of 128 BYTES and there is therefore the possibilities of reading it as well as of writing which would be more usual. Thus both read and write operations are identical to those described with reference to FIG.23.

Data Entry using the Keyboard

There is a program that causes reading of the keyboard until a key is pressed whereupon row in column decoding is effected and the result is then converted to ASCii and sent to the display. If unit 19 needs such data, it reads the text on the display and may, if desired, transmit it to the memory. It is important to note that unit 19 is always in operation, even during dialling, obtaining the number from the keyboard, converting it to ASCII, writing on the display, copying it in the memory for redialling purposes and finally sending the wave forms necessary for tone or pulse dialling to modulator.

Data Communication

On implementing the data communication program, interruption is enabled, that is to say, from that moment processing unit 19 may receive interruption requests when one is dealing with a data receiving operation. A data transmission operation involves inhibiting the interruption and effecting the data communication via modulator 26.

Before initiating data communication itself, it may be necessary first to effect an automatic dialling to a given telephone number (a bank account balance consultation, for example), this being carried out using specific programs.

The telephone line on-time may be drastically reduced by first preparing the data to be sent on the keyboard. The computerized telephone of the present invention has to do this in any case and a typical case is a directory enquiry consulation for which the telephone, by means of the key 17, makes all the necessary questions to the user before the telephone line is actually connected.

Once the user has checked his answers on the display 6, the directory enquiries key 10 is pressed and the handset 1 is then lifted so that automatic dialling can be effected and the relevant data bank may be accessed. It is important to note here that since demodulator 27 in combination with the data processing unit 19 is capable of recognizing any type of signal on the telephone line, it is possible by means of software applications to ensure that automatic dialling never occurs until the line connection is truly completed and unit 19 identifies a dial tone. Otherwise it would be necessary to lift the handset 1 prior to pressing key 10 or, in a conventional re-dial telephone with a redialling possibility, before pressing the re-dial key of key group 4.

When the telephone in not actually is use, the time automatically appears on display 6. At any other time, for example, during a telephone conversation, clock key 8 may be pressed so that conversation time may be measured.

If key 12 is pressed twice, the telephone will enter into a calculator mode and numerical keys 4 may then be used in conjunction with the calculator function keys $(+,-,\times,\div)$ which correspond to four of the alphabetical keys 5 (see FIG. 1).

When agenda key 7 is pressed, the user may use the keyboard to search a memorized agenda so as to place on display 6 any information previously introduced by the user via the keyboard and unit 19 to data memory 21. When the agenda search produces a desired information in the form of a telephone number, automatic dialling of that number may be carried out by simply lifting handset 1 after passing the re-dial key.

Although the computerized telephone of the invention has been described with respect to a specific embodiment thereof capable of several functions, it will be understood that the number of functions and operations may be expanded or reduced by suitable changes in the software and hardware. Thus, any additional applications that can be carried out by a small computer, independently of whether they make use of telephoning, may be made available without departing from the true scope of the invention.

Furthermore, the demodulator circuit comprising signal shaper 27 combined with processing unit 19 may be used in applications other than that of a computerized telephone since, as already stated, it represents an extremely elegant and economical manner of making an alternating signal of any type recognizable to a digital system. As previously explained, it may be used for both frequency and phase shift modulated signals.

We claim:

1. A telephone comprising a handset and an apparatus for receiving the handset provided with an alpha-numerical key-board, an alpha-numerical display, a programmed data processing unit, a read only memory and a random access memory associated with each other and with said data processing unit, an automatic dialling circuit controlled by said data processing unit and a communications controller for modulating data produced by said unit for transmission by the telephone line and for demodulating signals received from said telephone, said unit being so programmed as to be able to command an operation by means of the telephone line in dependence upon data received therefrom or derived from the keyboard, said key board including a directory inquiries data bank key associated with said data processing unit so that, on pressing said directory inquiries key, said data processing unit causes said automatic dialling circuit and said communications controller to access a directory inquiries data bank by means of the telephone line, to search for information in the form of a telephone number in response to an inquiry previously written on said display by means of said key board, to receive said information in the form of a telephone number from the directory inquiries bank, to indicate receipt thereof on said display and to effect automatic dialling of said telephone number by means of said dialling circuit.

2. Telephone according to claim 1, in which said communications controller includes a demodulator comprising a signal shaper connected between the telephone line and said data processing unit, said signal shaper deriving from a signal in the telephone line, a square wave output having the same frequency or phase as the fundamental frequency of said signal, one of the frequency and phase of said output being measured by said processing unit.

3. Telephone according to claim 2, in which said signal shaper comprises a transistor whose base is connected to said telephone line and whose collector produces said square wave output.

4. Telephone according to claim 3, and further comprising a filter and amplifier circuit to filter undesired noise from and to amplify said signal on the telephone line, said circuit being connected between the telephone line and said signal shaper.

5. Telephone comprising a handset and an apparatus for receiving the handset provided with an alpha-numerical key-board, an alpha-numerical display, a programmed data processing unit, a read only memory and a random access memory associated with each other and with said data processing unit, an automatic dialling circuit controlled by said data processing unit and a communications controller for modulating data produced by said unit for transmission by the telephone line and for demodulating signals received from said telephone, said unit being so programmed as to be able to command an operation by means of the telephone line in dependence upon data received therefrom or derived from the keyboard, said communications contoller including a demodulator comprising a signal shaper connected between the telephone line and said data processing unit, said signal shaper deriving from a signal in the telephone line, a square wave output having the same frequency or phase as the fundamental frequency of said signal, one of the frequency and phase of said output being measured by said processing unit.

6. Telephone according to claim 5, in which said signal shaper comprises a transistor whose base is connected to said telephone line and whose collector produces said square wave output.

7. Telephone according to claim 6, and further comprising a filter and amplifier circuit to filter undesired noise from and to amplify said signal on the telephone line, said circuit being connected between the telephone line and said signal shaper.

8. Telephone according to any of the claims 1, to 7, in which said key board, processing unit, and display are such that a telephone number may be dialled on said key board and sent to the display by the processing unit prior to making connection with the telephone line, and that, on making connection with the telephone line, the number is dialled automatically by said dialling circuit in accordance with the number shown on the display and with a command received from the processing unit.

9. Telephone according to claim 8, and further comprising means for recognizing a dial tone on the telephone line and further means in said data processing unit for preventing the transmission of a diallying signal in the absence of said recognition of the dial tone.

* * * * *